United States Patent
Suhail et al.

(10) Patent No.: US 11,683,281 B2
(45) Date of Patent: *Jun. 20, 2023

(54) SYSTEMS AND METHODS FOR INITIATING EXTERNAL ACTIONS VIA A GROUP-BASED COMMUNICATION SYSTEM

(71) Applicant: Salesforce, Inc., San Francisco, CA (US)

(72) Inventors: Salman Suhail, San Francisco, CA (US); Bruce Sullivan, San Francisco, CA (US); Patricia Ang, Oakland, CA (US); Hye Jung Choi, San Mateo, CA (US); Prajna Shetty, San Francisco, CA (US); Andrew Fong, Menlo Park, CA (US); Michael Deng, San Francisco, CA (US); Stephen Sowole, San Francisco, CA (US); Tolga Akin, San Francisco, CA (US); Pranay Agarwal, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,787

(22) Filed: Jun. 30, 2022

(65) Prior Publication Data
US 2022/0368655 A1    Nov. 17, 2022

Related U.S. Application Data

(63) Continuation of application No. 17/194,640, filed on Mar. 8, 2021, now Pat. No. 11,381,532, which is a
(Continued)

(51) Int. Cl.
*G06F 15/16* (2006.01)
*H04L 51/04* (2022.01)
(Continued)

(52) U.S. Cl.
CPC ............. *H04L 51/04* (2013.01); *G06Q 10/10* (2013.01); *H04L 51/046* (2013.01); *H04L 51/08* (2013.01);
(Continued)

(58) Field of Classification Search
CPC ....... H04L 51/04; H04L 51/08; H04L 51/216; G06Q 10/10
(Continued)

(56) References Cited

U.S. PATENT DOCUMENTS 7,406,418 B2   7/2008   Chiu
7,539,656 B2   5/2009   Fratkina et al.
(Continued)

FOREIGN PATENT DOCUMENTS

JP   2007518146 A   7/2007
JP   2014106592 A   6/2014

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages, (dated May 28, 2014, 2:48 PM).
(Continued)

*Primary Examiner* — Bharat Barot
(74) *Attorney, Agent, or Firm* — Lee & Hayes, P.C.

(57) ABSTRACT

A group-based communication platform can present, via a client device of the group-based communication platform, a user interface that includes a user interface element, interaction therewith, invoking a command associated with an external system. Based at partly on receiving an indication of an interaction with the user interface element, the group-based communication platform can cause payload data to be
(Continued)

provided to the external system, wherein the payload data is associated with an indication of the command invoked via the interaction. Based at least partly on causing the payload data to be provided to the external system, a response to the payload data can be received and an interactive dialog can be presented via the user interface. The interactive dialog can be configured to prompt a user of the client device for data to be provided to the external system for performing a processing action associated with the command.

20 Claims, 11 Drawing Sheets

Related U.S. Application Data continuation of application No. 16/528,453, filed on Jul. 31, 2019, now Pat. No. 10,951,556, which is a continuation of application No. 16/419,715, filed on May 22, 2019, now Pat. No. 10,855,630, which is a continuation of application No. 16/206,542, filed on Nov. 30, 2018, now Pat. No. 10,348,655, which is a continuation of application No. 16/176,883, filed on Oct. 31, 2018, now Pat. No. 10,701,003.

(60) Provisional application No. 62/674,491, filed on May 21, 2018.

(51) Int. Cl.

| | | |
|---|---|---|
| *H04L 51/08* | (2022.01) | |
| *G06Q 10/10* | (2023.01) | |
| *H04L 51/046* | (2022.01) | |
| *H04L 65/1063* | (2022.01) | |
| *H04L 65/1096* | (2022.01) | |
| *H04L 65/403* | (2022.01) | |
| *H04L 51/216* | (2022.01) | |
| *H04L 65/401* | (2022.01) | |
| *H04L 65/1045* | (2022.01) | |

(52) U.S. Cl.
CPC ........ *H04L 51/216* (2022.05); *H04L 65/1045* (2022.05); *H04L 65/1063* (2013.01); *H04L 65/1096* (2013.01); *H04L 65/401* (2022.05); *H04L 65/403* (2013.01)

(58) Field of Classification Search
USPC .................................................. 709/202–207
See application file for complete search history.

(56) References Cited

U.S. PATENT DOCUMENTS

| | | | |
|---|---|---|---|
| 8,365,081 | B1 | 1/2013 | Amacker et al. |
| 8,620,385 | B2 | 12/2013 | Counts et al. |
| 9,369,520 | B2 | 6/2016 | Luecke et al. |
| 9,532,227 | B2 | 12/2016 | Richards et al. |
| 10,348,655 | B1 | 7/2019 | Suhail et al. |
| 10,701,003 | B2 | 6/2020 | Suhail et al. |
| 10,951,556 | B2 | 3/2021 | Suhail et al. |
| 11,381,532 | B2* | 7/2022 | Suhail ..................... H04L 51/04 |
| 2003/0014670 | A1 | 1/2003 | Yuen et al. |
| 2003/0028451 | A1 | 2/2003 | Ananian |
| 2004/0006476 | A1 | 1/2004 | Chiu |
| 2004/0025499 | A1 | 2/2004 | Nakatani et al. |
| 2008/0043982 | A1 | 2/2008 | Waalkes et al. |
| 2009/0144131 | A1 | 6/2009 | Chiu et al. |
| 2013/0031208 | A1 | 1/2013 | Linton et al. |
| 2014/0245179 | A1* | 8/2014 | Raghavan .............. G06Q 10/10 715/753 |
| 2014/0307864 | A1 | 10/2014 | Odinak et al. |
| 2016/0055160 | A1 | 2/2016 | Himel et al. |
| 2016/0112366 | A1 | 4/2016 | Olsen et al. |
| 2016/0267544 | A1 | 9/2016 | Flood et al. |
| 2017/0093700 | A1 | 3/2017 | Gilley et al. |
| 2017/0126768 | A1 | 5/2017 | Tucker |
| 2017/0201850 | A1 | 7/2017 | Raleigh et al. |
| 2017/0228253 | A1 | 8/2017 | Layman et al. |
| 2018/0212903 | A1 | 7/2018 | Rose et al. |
| 2018/0287982 | A1 | 10/2018 | Draeger et al. |
| 2018/0337795 | A1 | 11/2018 | Katrak et al. |
| 2019/0103104 | A1 | 4/2019 | Nicholls et al. |
| 2021/0203624 | A1 | 7/2021 | Suhail et al. |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

EP Office Action from corresponding EP Application No. 19728560.4, dated Mar. 1, 2021, 8 pages.

Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;26 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (Nov. 2018) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/? context=1000516, (dated Feb. 12, 2014, 7:03 PM), 3 pages.

Internet Relay Chat, WIKIPEDIA, [online][retrieved May 30, 2019]. Retrieved from the Internet: <URL: https://en.wikipedia.org/wiki/Internet_Relay_Chat>. (dated May 28, 2019) 21 pages.

International Seach Report and Written Opinion for corresponding International Application No. PCT/US2019/031668, dated Jul. 17, 2019, 13 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Translated Japanese Office Action dated Nov. 16, 2021 for Japanese Patent Application No. 2021-126393, a foreign counterpart to U.S. Pat. No. 10,701,003, 4 pages.

Japanese Office Action mailed Apr. 13, 2021 for Japanese Patent Application No. 2020-541489, a foreign counterpart of U.S. Pat. No. 10,701,003, 2 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", FUJITSU Sci. Tech. J., 36, 2, (Dec. 2000), pp. 154-161.

Office Action for U.S. Appl. No. 16/419,715, dated May 14, 2020, Suhail, "Systems and Methods for Initiating External Actions Via a Group-Based Communication System", 9 pages.

Office Action for U.S. Appl. No. 16/528,453, dated Aug. 6, 2020, Suhail, "Systems and Methods for Initiating External Actions Via a Group-Based Communication System", 10 pages.

Office Action for U.S. Appl. No. 17/194,640, dated Oct. 28, 2021, Suhail, "Systems and Methods for Initiating External Actions Via a Group-Based Communication System", 9 pages.

(56) References Cited

OTHER PUBLICATIONS

Oikarinen, J. & Reed, D., "Internet Relay Chat Protocol", Request for Comments: 1459, Nerwork Working Group, [online][retrieved May 30, 2019], Retrieved from the Internet: <URL: https://www.rfc-editor.org/rfc/rfc1459txt>. (dated May 1993) 57 pages.

Ernie Smith, "Picking Up The Slack", TEDIUM, [online][retrieved May 9, 2019]. Retrieved from the Internet: <URL https://tedium.co/2017/10/17/irc-vs-slack-chat-history/>. (dated Oct. 17, 2017) 13 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 5 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

\* cited by examiner

FIG. 7

SYSTEMS AND METHODS FOR INITIATING EXTERNAL ACTIONS VIA A GROUP-BASED COMMUNICATION SYSTEM

CROSS-REFERENCE TO RELATED APPLICATIONS

This patent application is a continuation of U.S. application Ser. No. 17/194,640, filed Mar. 8, 2021, issuing as U.S. Pat. No. 11,381,532 on Jul. 5, 2022, which is a continuation of U.S. application Ser. No. 16/528,453, filed Jul. 31, 2019, now U.S. Pat. No. 10,951,556, which issued on Mar. 16, 2021, which is a continuation of U.S. application Ser. No. 16/419,715, filed May 22, 2019, now U.S. Pat. No. 10,855,630, which issued on Dec. 1, 2020, which is a continuation of U.S. application Ser. No. 16/206,542, filed Nov. 30, 2018, now U.S. Pat. No. 10,348,655, which issued on Jul. 9, 2019, which is a continuation of U.S. application Ser. No. 16/176,883, filed on Oct. 31, 2018, now U.S. Pat. No. 10,701,003, which issued on Jun. 30, 2020, which claims priority from U.S. Provisional Application Ser. No. 62/674,491, filed May 21, 2018, all of which are incorporated herein by reference in their entirety.

BACKGROUND

Systems have been provided for exchanging and consolidating messages within a communications interface among a plurality of client devices and external systems via an at least partially centralized messaging server system.

Through applied effort, ingenuity, and innovation many deficiencies of such systems have been solved by developing solutions that are in accordance with the embodiments of the present invention, many examples of which are described in detail herein.

BRIEF SUMMARY

Various embodiments are directed to systems and methods for enabling substantive interactions between a group-based communication platform and one or more external systems, thereby enabling the group-based communication platform to perform various functions within those external systems.

Various embodiments are directed to a computer-implemented method for executing processing actions based on messages within an external application system. In certain embodiments, the method comprises, generating, via one or more processors of a group-based communication platform, a container comprising contextual data and payload data, wherein the contextual data is generated based at least in part on a data stored within a processing action table and identifies (1) a processing action to be performed by an external application system and (2) a client token identifying a client device requesting the processing action, and the payload data comprises a message exchanged via the group-based communication platform; providing, via the one or more processors of the group-based communication platform, the container to a proxy endpoint accessible to the external application system to enable the external application system to retrieve data within the container and to execute the identified processing action based at least in part on the payload data; receiving, via the one or more processors of the group-based communication platform, a response from the external application system, wherein the response comprises the client token identifying the client device requesting the processing action; based at least in part on the response, causing the client device to display an interactive dialog; receiving additional data from the client device via the interactive dialog; and transmitting the additional data to the proxy endpoint to be associated with the container to enable the external application system to utilize the additional data to execute the processing action.

In certain embodiments, the method further comprises receiving a confirmation response from the external application system indicating completion of the requested processing action; and transmitting a confirmation message to the requesting client device. In certain embodiments, the confirmation message is transmitted to the client device as a message. Moreover, in various embodiments, the message is shared between a plurality of client devices within a communication channel via the group-based communication platform, wherein the communication channel has an associated channel identifier. In such embodiments, the method further comprises: causing the client device to display a curated list of a plurality of processing actions, wherein the processing actions included within the curated list are selected based at least in part on a channel identifier; and receiving input from the client device selecting the processing action to be performed.

Moreover, the message may be associated with one or more characteristics. In such embodiments, the method further comprises: causing the client device to display a curated list of a plurality of processing actions, wherein the processing actions included within the curated list are selected based at least in part on the characteristics associated with the message; and receiving input from the client device selecting the processing action to be performed. Moreover, the characteristics associated with a message may identify a sending user identifier of the message, and wherein the processing actions included within the curated list are selected based at least in part on the sending user identifier of the message. In certain embodiments, the message comprises at least one of: a text-based message or a file object.

Various embodiments are directed to a system configured for executing a processing action based on a message shared via a group-based communication platform within an external application system. In certain embodiments, the group-based communication platform comprises: one or more non-transitory memory storage repositories, wherein the one or more non-transitory memory storage repositories comprise a processing action table identifying one or more processing actions available for one or more messages; and one or more processors, wherein the one or more processors are collectively configured to: receive a selection of a message and a processing action for the message from a client device, wherein the processing action is selected from the processing action table; generate a container comprising contextual data and payload data based upon the selection of the message and the processing action for the message, wherein the contextual data is generated based at least in part on a data stored within a processing action table and identifies (1) a processing action to be performed by an external application system and (2) a client token identifying the client device requesting the processing action, and the payload data comprises a message exchanged via the group-based communication platform; provide the container to a proxy endpoint accessible to the external application system to enable the external application system to retrieve data within the container and to execute the identified processing action based at least in part on the payload data; receive, a response from the external application system, wherein the response comprises the client token identifying the client device requesting the processing action; based at least in part on the response, cause the client device to display an interactive dialog; receive additional data from the client device via the interactive dialog; and transmit the additional data to the proxy endpoint to be associated with the container to enable the external application system to utilize the additional data to execute the processing action.

In various embodiments, the one or more processors are further configured to: receive a confirmation response from the external application system indicating completion of the requested processing action; and transmit a confirmation message to the requesting client device. In certain embodiments, the confirmation message is transmitted to the client device as a message. Moreover, the message may be shared between a plurality of client devices within a communication channel via the group-based communication platform. In such embodiments, the communication channel has an associated channel identifier and wherein the one or more processors are further configured to: cause the client device to display a curated list of a plurality of processing actions, wherein the processing actions included within the curated list are selected based at least in part on a channel identifier; and wherein the selection of the processing action is based at least in part on the curated list of a plurality of processing actions.

In various embodiments, the message is shared between a plurality of client devices within a communication channel via the group-based communication platform. In such embodiments, the communication channel has an associated channel identifier and wherein the one or more processors are further configured to: cause the client device to display a curated list of a plurality of processing actions, wherein the processing actions included within the curated list are selected based at least in part on characteristics associated with the message; and wherein the selection of the processing action is based at least in part on the curated list of a plurality of processing actions. Moreover, the characteristics associated with a message may identify a sending user identifier of the message, and the processing actions included within the curated list may be selected based at least in part on the sending user identifier of the message. Moreover, the message may comprise at least one of: a text-based message or a file object.

Certain embodiments are directed to a computer program product for executing a processing action based on a message within an external application system, the computer program product comprising at least one non-transitory computer-readable storage medium having computer-readable program code portions stored therein. In certain embodiments, the computer-readable program code portions comprising an executable portion configured to: generate a container comprising contextual data and payload data, wherein the contextual data is generated based at least in part on a data stored within a processing action table and identifies (1) a processing action to be performed by an external application system and (2) a client token identifying a client device requesting the processing action, and the payload data comprises a message exchanged via the group-based communication platform; provide the container to a proxy endpoint accessible to the external application system to enable the external application system to retrieve data within the container and to execute the identified processing action based at least in part on the payload data; receive a response from the external application system, wherein the response comprises the client token identifying the client device requesting the processing action; based at least in part on the response, cause the client device to display an interactive dialog; receive additional data from the client device via the interactive dialog; and transmit the additional data to the proxy endpoint to be associated with the container to enable the external application system to utilize the additional data to execute the processing action.

In certain embodiments, the executable portions are further configured to: receive a confirmation response from the external application system indicating completion of the requested processing action; and transmit a confirmation message to the requesting client device. Moreover, the confirmation message may be transmitted to the client device as a message.

In certain embodiments, the message is shared between a plurality of client devices within a communication channel via the group-based communication platform, and in such embodiments the communication channel has an associated channel identifier and wherein the computer program product further comprises an executable portion configured to: cause the client device to display a curated list of a plurality of processing actions, wherein the processing actions included within the curated list are selected based at least in part on a channel identifier; and receive input from the client device selecting the processing action to be performed.

In various embodiments, the message is associated with characteristics, and in such embodiments the computer program product further comprises an executable portion configured to: cause the client device to display a curated list of a plurality of processing actions, wherein the processing actions included within the curated list are selected based at least in part on the characteristics associated with the message; and receive input from the client device selecting the processing action to be performed. Moreover, the characteristics associated with a message may identify a sending user identifier of the message, and the processing actions included within the curated list may be selected based at least in part on the sending user identifier of the message. In certain embodiments, the message comprises at least one of: a text-based message or a file object.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 illustrates a wireframe 700 of a group-based communication interface in accordance with one embodiment.

DETAILED DESCRIPTION

Glossary

Figure 1:
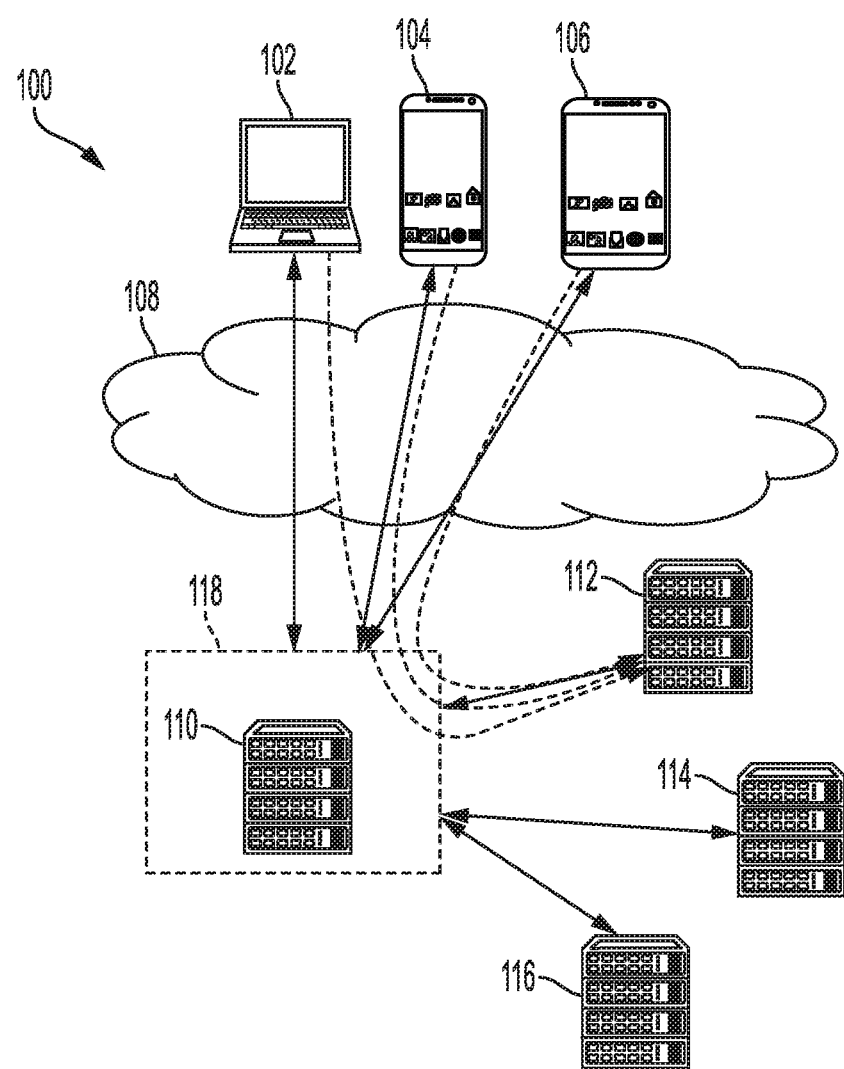
FIG. 1 illustrates a schematic view of a system 100 encompassing a group-based communication platform in communication with one or more client devices in accordance with one embodiment.

"Group identifier" in this context refers to one or more items of data by which a group within a group-based communication system may be identified. Group identifiers may also be referred to as "team identifiers" in certain embodiments. For example, a group identifier or team identifier may comprise ASCII text, a pointer, a memory address, and the like.

"User" in this context refers to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

"Sending user identifier" in this context refers to a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

"Contextual data" in this context may identify various aspects of a processing action to be performed by an external system on behalf of a requesting client device. The contextual data may be utilized by the group-based communication system to appropriately route a container to an appropriate proxy endpoint to trigger and external system to perform a particular processing action. The contextual data may be further utilized by the external system to identify the requested processing action to be performed and/or to identify any additional data that should be requested from the client device (e.g., via one or more interactive dialogs presented via a group-based user interface). Moreover, the contextual data may identify various characteristics of a message object (e.g., a message, a file, a plurality of messages (e.g., all messages within a communication channel), and/or the like), such as a timestamp indicating when a particular message object was shared via the group-based communication platform, a sending-user identifier indicating a user (and/or client device) that initially shared the message object, a client token identifying the client device requesting the processing action, and/or the like.

"Client device" in this context refers to computer hardware(s) and/or software(s) that is/are configured to access one or more services made available by one or more servers. The server(s) is/are often (but not always) on another computer system, in which case the client device accesses the service by way of a network. A client device may be associated with a group identification, where the group identification is an electronic indication that suggests a group (e.g., user group) that the user belongs to. Client devices may include, without limitation, smart phones, tablet computers, laptop computers, desktop computers, wearable devices, personal computers, enterprise computers, and the like.

"User profile" in this context refers to information associated with a user, including, for example, a user identifier, one or more communication channel identifiers (e.g., group-based communication channel identifiers) associated with communication channels (e.g., group-based communication channels) that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The term user profile may be used interchangeably with "user account, and user account details." The user account details can include a subset designation of user credentials, such as, for example, login information for the user including the user's username and password.

"Curated list" in this context refers to a listing of available processing actions that may be presented to a user via a group-based communication interface displayable via a client device. In certain embodiments, the curated list of processing actions excludes certain processing actions to the user, such that the curated list of processing actions includes only a subset of all of the processing actions available to a user. For example, the curated list of processing actions may include a defined number of available processing actions (e.g., 5 processing actions) selected based on one or more display criteria. These display criteria may be identified based at least in part on contextual metadata associated with a message for which a processing action is intended to be utilized (e.g., the processing actions displayed within the curated list may include processing actions available for messages having a particular sending user identifier, such as messages generated by a particular app), based at least in part on a communication channel in which a message is shared, based on recency and/or frequency-based algorithms identify the most recently used and/or most commonly used processing actions for a particular user, and/or the like. In certain embodiments, the curated list may be generated based at least in part on data stored at an individual client device (e.g., data indicative of the most recently used processing actions for a particular client device) and/or data stored in one or more data repositories located at the group-based communication platform.

"Message distribution servers" in this context refers to computing devices configured for interacting with various client devices for receiving and/or disseminating messages for distribution within communication channels. Message distribution servers may be configured to receive, store (in an associated database), and/or direct messages exchanged between users (operating via client devices). The functionality of the message distribution servers may be provided via a single server or collection of servers having a common functionality, or the functionality of the message distribution servers may be segmented among a plurality of servers or collections of servers performing subsets of the described functionality of the message distribution servers. For example, a first subset of message distribution servers may be configured for receiving messages from client devices and/or for transmitting messages to client devices (e.g., via one or more interface servers). These message distribution servers may be in communication with a second subset of message distribution servers configured for collecting messages distributed within communication channels and for storing those messages within a message repository database for indexing and archiving.

"Communication channel" in this context refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users) for sharing messages among all users of the group. The communication channels may also and/or alternatively be one-to-one, direct message communication channels established between and among two client devices (and their respective users) for sharing messages among only those two users. Multiple communication channels may operate on each of one or more computing devices, and therefore a communication channel identifier may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels. A communication channel may be "public," which may allow any client device to join and participate in the information sharing through the communication channel. A communication channel may be "private," which may restrict data communications in the communication channel to certain client devices and/or users.

"Payload data" in this context refers to data forming a portion of a container, as discussed herein. The payload data may comprise one or more messages (e.g., message text, files attached to an exchanged message, a plurality of discrete exchanged messages, and/or the like.

"Interactive dialog" in this context refers to a user interface element configured to accept user input (e.g., as a selection of one or more of a plurality of available options, as freeform input, and/or the like). The dialog may be presented as a pop-up or an overlaid display element displayed visually over another portion of a user interface, or the dialog may be presented as a portion of a larger user interface element.

"External application system" in this context refers to a system operating via one or more servers which are in network communication with a group-based communication platform, and which service, manage, and/or perform actions that form various functions of an app that is accessible via the group-based communication platform. The external application systems may comprise additional storage repositories (e.g., databases) associated with tasks, functions, and/or actions that may be performed via the external application system. In certain embodiments, the external application system operates one or more executable software products to perform the various tasks, functions, and/or actions associated with the external application system. As various examples, an external application system may be configured for executing a calendaring/scheduling app, a to-do list app, a service provider app, a software testing app, a storage repository app, and/or the like.

"Data" in this context refers to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

"Client token" in this context refers to an identifier that uniquely identifies a particular client device. The client tokens may be static (e.g., such that a client device is permanently associated with a particular client token until an affirmative action is taken to change the associated client token) or dynamic (e.g., such that a client token is assigned to a particular client device for a short duration, such as the period of time associated with performing a particular task, the period of time associated with a unique client session with a group-based communication platform, and/or the like). Moreover, client tokens may be encrypted in certain embodiments utilizing any of a variety of encryption methodologies for added security against unauthorized usage of the client token.

"Private group-based communication channel" in this context refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

"Group-based communication platform" in this context refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows. Group-based communication platform users are organized into organization groups (e.g., employees of each company may be a separate organization group) and each organization group may have one or more communication channels (e.g., group-based communication channels) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier). Group-based communication system users may join and/or create communication channels (e.g., group-based communication channels). Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

"Processing action" in this context refers to an executable action performed by an external system (e.g., an app accessible via the group-based communication platform). The processing action may be embodied as a data generation process, a data manipulation process, and/or the like that is perfumed based at least in part on data included within a container provided from the group-based communication platform to the external system. As various examples, a processing action may be the creation of a calendar object (e.g., via a scheduling app), the creation of a "to-do" item (e.g., via a productivity app), the creation of a service ticket (e.g., via a service app), the creation of a bookmark (e.g., via a link compilation app), the creation of a file (e.g., via a document editing app), and/or the like.

"Container" in this context refers to a collection of individual data elements that may be transmitted between a plurality of computing entities collectively, such that the included data remains associated therewith. The container may be configured to store data therein with a standardized formatting, such that computing entities may be configured to automatically determine the type of data stored within the container. For example, a container may comprise substantive data to be passed between computing entities stored within a payload of the container, and the container may comprise metadata associated with the generation of the container that is stored within a contextual data portion of the container.

"File object" in this context refers to an example of a message that may be provided as payload data within a container to an external system to perform a requested processing action. A file object may be any of a variety of executable file types, such as a ".pdf" file, a ".docx" file, a ".xml" file, a ".html" file, a ".tp" file, and/or the like.

"Channel identifier" in this context refers to one or more items of data by which a group-based communication channel may be identified. Channel identifiers may also be referred to as "group-based communication channel identifiers" in certain embodiments. For example, a group-based communication channel identifier may comprise ASCII text, a pointer, a memory address, and the like.

"Message" in this context refers to any electronically generated digital content object provided by a user using a client device and that is configured for display within a group-based communication channel interface. Messages may also be referred to as "messaging communications" in certain embodiments. Messages may include or be embodied as any text, image, video, audio, files, interactive links, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like "Group-based communication channel interface" in this context refers to a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel.

"Proxy endpoint" in this context refers to a data transfer interface, for example an Application Program Interface (API) between unconnected computing systems via a network. The proxy endpoint may be accessible over the network via a URL. For example, a proxy endpoint may enable data transfer of a container (comprising contextual data and/or payload data) from a group-based communication system to an external system associated with an app published and usable via the group-based communication system. In various embodiments, the proxy endpoint is defined at least in part by a URL accessible to the external system, wherein the URL may be utilized to direct the external system to a particular dataset (e.g., one or more containers). As discussed herein, containers provided to the external system via the proxy endpoint may comprise data formatted to enable usage by the external system to perform a desired processing action. The proxy endpoint enables transfer of the container data to the external system while maintaining the necessary formatting of the container to enable the external system to use the included data. Moreover, in certain embodiments the proxy endpoint enable real-time transmission of data to the external system (e.g., via push-based message transmission). In other embodiments, the proxy endpoint may be configured to enable the external system to pull data from the group-based communication platform (e.g., upon the occurrence of a trigger event acting to inform the external system of the presence of data that is ready for transmission).

Description

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

As discussed herein, certain embodiments are directed to systems and methods enabling a group-based communication platform to perform various actions within external systems. Such configurations enable users of the group-based communication platform to initiate various actions within various external systems based on commands and/or processes performed within a group-based communication interface of the group-based communication platform. For example, messages, files, threads, groups of messages, and/or other objects usable within the group-based communication platform may be exported from the group-based communication platform and automatically imported into one or more external systems to generate various objects usable within those external systems. Thus, messages exchanged via the group-based communication platform may be provided to external systems to create and populate applicable to-do list items, to generate and populate one or more documents, and/or the like.

The group-based communication platform is configured to provide data to the external systems within defined containers, wherein each container comprises contextual data indicative of the message, file, or other object for which the container was generated, a time-stamp associated with the creation of the object, a client device token identifying the requesting client device, an external system (e.g., an app) to which the container is to be directed, and/or an action to be performed by the external system. The container further includes the object itself (e.g., the message, file, and/or the like) within a payload portion of the container to pass the object to the external system. Ultimately, the data included within the container is passed to the external system using an API to provide the data to the external system in the appropriate format to execute the requested action.

Upon receipt of an appropriate request message from the external system, the group-based communication platform utilizes the client token to identify an appropriate client device for presentation of a dialog to collect additional information to be utilized by the external system to perform the requested action. The dialog may be retrieved from a separate dialog storage area (e.g., stored in association with the group-based communication platform) accessible via a dialog API. The request message may, in certain embodiments, comprise a dialog trigger identifier that may be presented to the dialog storage area via the dialog API. In return, an appropriate dialog corresponding to the dialog trigger identifier and having appropriate fields for presentation to a user is retrieved. For example, the dialog may comprise a plurality of alternatively selectable options (those options being available within the external system) for use with the requested action. Various data generated and/or otherwise provided via the dialog are provided back to the external system and associated with the original container presented thereto. Upon successfully providing data to the external system, the group-based communication platform provides a confirmation to the client device (e.g., as a separate notification icon and/or via a message provided via the group-based communication interface).

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing system 100 within which embodiments of the present invention may operate. Users may access a group-based communication platform 118 via a communication network 108 using client devices 102-106.

Communication network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 108 may include a cellular telephone, an 802.11, 802.16, 802.20, and/or WiMax network. Further, the communication network 108 may include a public network, such as the Internet, a private network, such as an intranet, or combinations thereof, and may utilize a variety of networking protocols now available or later developed including, but not limited to TCP/IP based networking protocols. As discussed herein, the networking protocol is configured to enable data transmission via websocket communications. For instance, the networking protocol may be customized to suit the needs of the group-based communication system. In some embodiments, the protocol is a custom protocol of JSON objects sent via a websocket channel. In some embodiments, data may be transmitted via a plurality of protocols, such as JSON over RPC, JSON over REST/HTTP, and the like.

In the illustrated embodiment, the group-based communication platform 118 includes an at least one message distribution server(s) 110 accessible via the communication network 108. Collectively, the at least one message distribution server(s) 110 is configured for receiving messages transmitted from one or more client devices 102-106, storing the messages within database storage areas for individual communication channels, and/or for transmitting messages to appropriate client devices 102-106.

The client devices 102-106 may be any computing device as defined above. Electronic message data exchanged between the message distribution server(s) 110 and the client device 102-106 may be provided in various forms and via various methods.

In some preferred and non-limiting embodiments, one or more of the client devices 102-106 are mobile devices, such as smartphones or tablets. The one or more client devices may execute an "app" to interact with the message distribution server(s) 110. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system. Thus, via the app executing on the client devices 102-106, these client devices 102-106 are configured for communicating with the group-based communication platform 118.

In some preferred and non-limiting embodiments, the client devices 102-106 may interact with the message distribution server(s) 110 via a web browser. The client devices 102-106 may also include various hardware or firmware designed to interact with the message distribution server(s) 110. Again, via the browser of the client devices 102-106, the client devices 102-106 are configured for communicating with the group-based communication platform 118.

In some embodiments of an exemplary group-based communication platform 118, a message or messaging communication may be sent from a client device 102-106 to a group-based communication platform 118. In various implementations, messages may be sent to the group-based communication platform 118 over communication network 108 directly by one of the client devices 102-106. The messages may be sent to the group-based communication platform 118 via an intermediary such as a message server, and/or the like. For example, a client device 102-106 may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., file objects), message hierarchy data (e.g., the message may be a reply to another message), third party metadata, and/or the like. In one embodiment, the client device 102-106 may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL    <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
```

-continued

```
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
        <client_OS>iOS</client_OS>
        <client_OS_version>7.1. 1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14
(KHTML, like Gecko) Version/7.0.3 Safari/537.75.14</user_agent_string>
        <client_product_type>MacPro5,1</client_product_type>
        <client_serial_number>YXXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy our patent policy.</contents>
        <attachments>patent_policy.pdf</attachments>
    </message>
</auth_request>
```

In the illustrated embodiment, the group-based communication platform 118 comprises a plurality of message distribution server(s) 110 configured to receive messages transmitted between a plurality of client devices 102-106 within a channel identified by a channel identifier and/or a group identifier, and to facilitate dissemination of those messages among client devices 102-106 that collectively form the membership of the communication channel.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, file objects may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the message distribution servers 107). Metadata associated with the message may be determined and the message may be indexed in the message distribution server(s) 110. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the message distribution server(s) 110 to facilitate searching. In one embodiment, the files may be indexed such that a company's or a group's files are indexed at a separate distributed repository. Similarly, as discussed herein, app data associated with various external application systems and/or processing actions may be stored in association with a particular group's messages, such that app data associated with a plurality of groups are stored separately.

Examples of electronic message exchange among one or more client devices 102-106 and the group-based communication platform 118 are described below in reference to FIG. 1.

As shown in FIG. 1, the group-based communication platform 118 enables individual client devices 102-106 to exchange messages with one another and to interact with one or more external application systems 112-116. To exchange messages between client devices 102-106, individual client devices 102-106 transmit messages (e.g., text-based messages, file objects, video and/or audio streams, and/or the like) to the group-based communication platform 118. Those messages are ultimately provided to one or more message distribution server(s) 110, which indexes the messages and distributes those messages to the intended recipients (e.g., client devices 102-106) of the message.

In accordance with the embodiment shown in FIG. 1, the client devices 102-106 are configured to display the received messages in a contextually-relevant user interface available to the user of the client device. For example, messages transmitted from a first client device 102 as a part of a group-based communication channel are displayed in a user interface display on client devices 102-106 associated with other members of the group-based communication channel.

As discussed in greater detail herein, messages may be provided to external application systems 112-116 to initiate one or more processing actions executable within the respective external application system. In certain embodiments, those processing actions are made available to client devices 102-106 on a group-basis (e.g., such that individual processing actions are available to every member of a particular group), on a communication channel basis (e.g., such that individual processing actions are available to every member of a particular communication channel), on an individual basis (e.g., such that individual processing actions are available to certain individual client devices 102-106), on a sending user identifier basis (e.g., such that individual processing actions are available only for certain messages transmitted by particular users, such that the message is associated with a particular sending user identifier, and/or the like. As an added limitation, certain processing actions may only be executable via client devices 102-106 that are directly authenticated with a particular external application system configured to execute the processing action (as indicated by the dashed lines between the individual client devices 102-106 and example external application system 112.

Example Apparatuses Utilized with Various Embodiments

Figure 2:
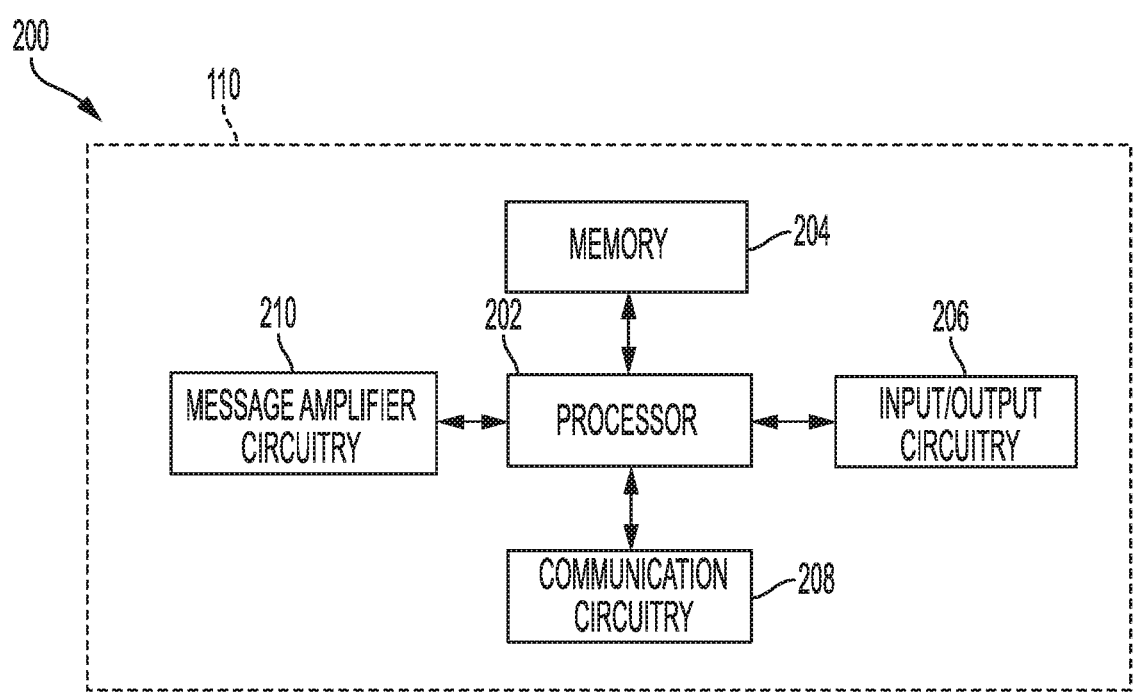
FIG. 2 illustrates an apparatus 200 of a message distribution server(s) 110 in accordance with one embodiment.

Each message distribution server(s) 110 may be embodied by one or more computing systems, such as apparatus 200 shown in FIG. 2. The apparatus 200 may include processor 202, memory 204, input/output circuitry 206, communications communication circuitry 208, and message amplifier circuitry 210. The apparatus 200 may be configured to execute the operations described herein with respect to FIG. 3-FIG. 11. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus 200 to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 102-106 to enable message sharing therebetween. The processor 202 ensures that messages intended for exchange between the client devices 102-106 within the particular communication channel are properly disseminated to those client devices 102-106 for display within respective display windows provided via the client devices 102-106.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 102-106.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communication circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communication circuitry 208 may include, for example, a network interface for enabling communications with a wired or wireless communication network. For example, the communication circuitry 208 may include one or more network interface cards, antennae, buses, switches, routers, modems, and supporting hardware and/or software, or any other device suitable for enabling communications via a network. Additionally or alternatively, the communication circuitry 208 may include the circuitry for interacting with the antenna/antennae to cause transmission of signals via the antenna/antennae or to handle receipt of signals received via the antenna/antennae.

Message amplifier circuitry 210 includes hardware configured to copy and amplify electronic messages and associated metadata received from one or more client devices 102-106 to other client devices 102-106 based on database shard(s). The message amplifier circuitry 210 may utilize processing circuitry, such as the processor 202, to perform these actions. However, it should also be appreciated that, in some embodiments, the message amplifier circuitry 210 may include a separate processor, specially configured Field Programmable Gate Array (FPGA), or Application Specific Integrated Circuit (ASIC) for performing the functions described herein. The message amplifier circuitry 210 may be implemented using hardware components of the apparatus 200 configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of each apparatus 200, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communication circuitry 208 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform may comprise one or more databases configured for storing and/or indexing messages exchanged within various group-based communication channels.

Example Data Flows

Figure 3:
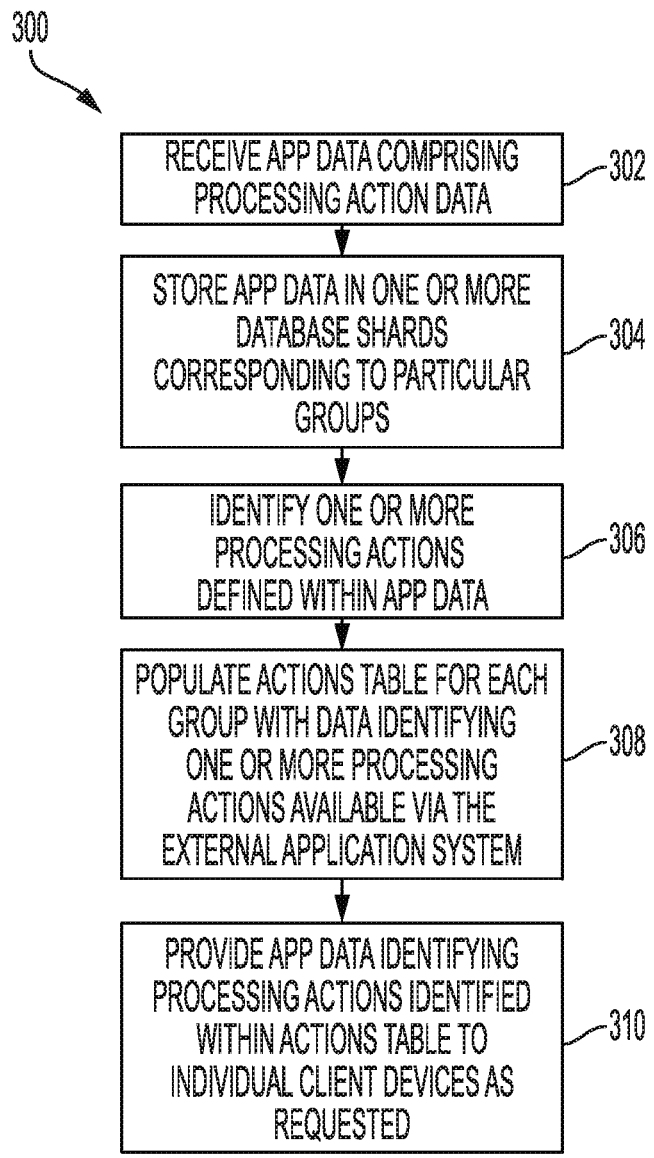
FIG. 3 illustrates a flowchart 300 for loading a processing action for a group-based communication platform in accordance with one embodiment.

FIG. 3 provides a flowchart 300 illustrating various processes for making various processing actions available to one or more client devices 102-106. In certain embodiments, processing actions may be made available to the group-based communication platform 118 for usage by users via associated client devices 102-106. In various embodiments, processing actions may be published to the group-based communication platform 118 such that any client device accessing the group-based communication platform 118 may have access to the various processing actions. In other embodiments, the processing actions may be made available to particular groups having access to additional functionalities provided via the external application system 112-116 associated with the particular processing action. In such embodiments, underlying configuration data for a particular processing action is stored in a database shard(s) associated with a particular group, and the underlying configuration data thereby makes the particular processing action available to any client device associated with the particular database shard(s).

Beginning at block 302, the group-based communication platform 118 receives app data from an external application system 112-116 comprising processing action data. The app data may comprise data indicative of various objects (e.g., file objects) that may be provided from an external application system 112-116 to the group-based communication platform 118, as well as various processing actions that may be performed at the external application system 112-116 based on data (e.g., contextual data and/or payload data within a container) provided from the group-based communication platform 118 to the external application system 112-116. As discussed in reference to FIG. 4 and FIG. 5, portions of the app data associated with a particular processing action may comprise data identifying a particular proxy endpoint to be utilized for data transfer between the group-based communication platform 118 and the associated external application system 112-116, the app data associated with the particular processing action may additionally comprise data identifying one or more identifiers (e.g., a name to be displayed to users and/or a callback identifier to be utilized via executable programs to initiate the processing action) associated with the processing action, a description associated with the processing action, an image (e.g., an icon) associated with the processing action, and/or the like.

With reference again to FIG. 3, the process for making a particular processing action available continues as indicated at block 304, by storing app data in database shards corresponding to particular groups. As discussed herein, the app data may be stored individually for various groups, and accordingly the app data is stored in a database shard associated with the particular group, such that client devices 102-106 associated with the particular group have access to the stored app data (and accordingly the app data associated with the particular processing action). Thus, when providing updates to functionality provided by the external application system 112-116, updates are disseminated and stored via each database shard(s) such that the updated app data is available to individual groups. In certain embodiments, updates may be disseminated to individual database shards only upon approval from an administrator associated with the particular group and database shard. Similarly, when introducing a new processing action, app data associated with the new processing action is disseminated to all database shard(s) having app data associated with the particular external application system 112-116.

Making a particular processing action available to client devices 102-106 associated with a particular group continues as indicated at block 306 of FIG. 3. As illustrated therein, the group-based communication platform 118 identifies one or more processing actions defined within the app data provided by a particular external application system 112-116. In certain embodiments, the app data may be provided from an external application system 112-116 specifically in reference to a particular processing action (e.g., provided as an update to an existing app), although the app data may also generally be provided as data defining various functionalities available via the app, and the processing actions may be identified as one of the plurality of functionalities therein. The identified processing actions may be utilized to populate an actions table identifying one or more processing actions available to client devices 102-106 associated with a particular group. In certain embodiments, a plurality of actions tables may be stored within each database shard, with each action table corresponding to a particular external application system 112-116. For example, a first action table may identify processing actions available from a first external application system 112, and a second actions table may identify processing actions available from a second external application system 114. As yet another example, a single actions table may be provided in each database shard, wherein the single actions table identifies all processing actions available to client devices 102-106 associated with the particular group, including processing actions available from a plurality of external application systems 112-116.

In certain embodiments, the action table identifies various characteristics of each processing action identified therein. For example, the actions table identifies instances in which particular processing actions are to be presented to client devices 102-106, particular messages eligible for usage with a particular processing action, particular users eligible to use particular processing actions, and/or the like.

Finally, as indicated at block 310 of FIG. 3, the group-based communication platform 118 provides data indicative of processing actions available to particular client devices 102-106, to client devices 102-106 upon receipt of requests from the individual client devices 102-106. For example, a client device 102-106 may receive user input selecting a particular selection element 704 (as illustrated in FIG. 7, discussed in greater detail herein), and may transmit a request for a curated list of available processing actions to the group-based communication platform 118. As discussed in greater detail in reference to FIG. 6-FIG. 11, the group-based communication platform 118 provides a curated list of at least a subset of available processing actions (processing actions defined within the actions table) to be displayed via a user interface element via the client device.

In certain embodiments, the actions table may remain stored at the group-based communication platform 118 (e.g., via database shards), and may be selectably accessible by the client devices 102-106 via communication network 108. However, in certain embodiments, at least a portion of the actions table (e.g., portions of the actions table utilized to populate a curated list) may be stored locally on a client device 102-106 (e.g., via a cache memory populated upon startup of a group-based communication app on the client device 102-106).

Moreover, updates may be provided to the actions table (or processing actions indicated within the actions table) from the respective external application systems 112-116. In certain embodiments, updates to individual processing actions may be provided from the applicable external application system 112-116 individually, or updates to processing actions may be provided from applicable external application systems 112-116 as a group, such that a single transmission of update data may be provided from a particular external application system 112-116 to provide updates for a plurality of processing actions associated with that external application system 112-116 simultaneously.

Figure 4:
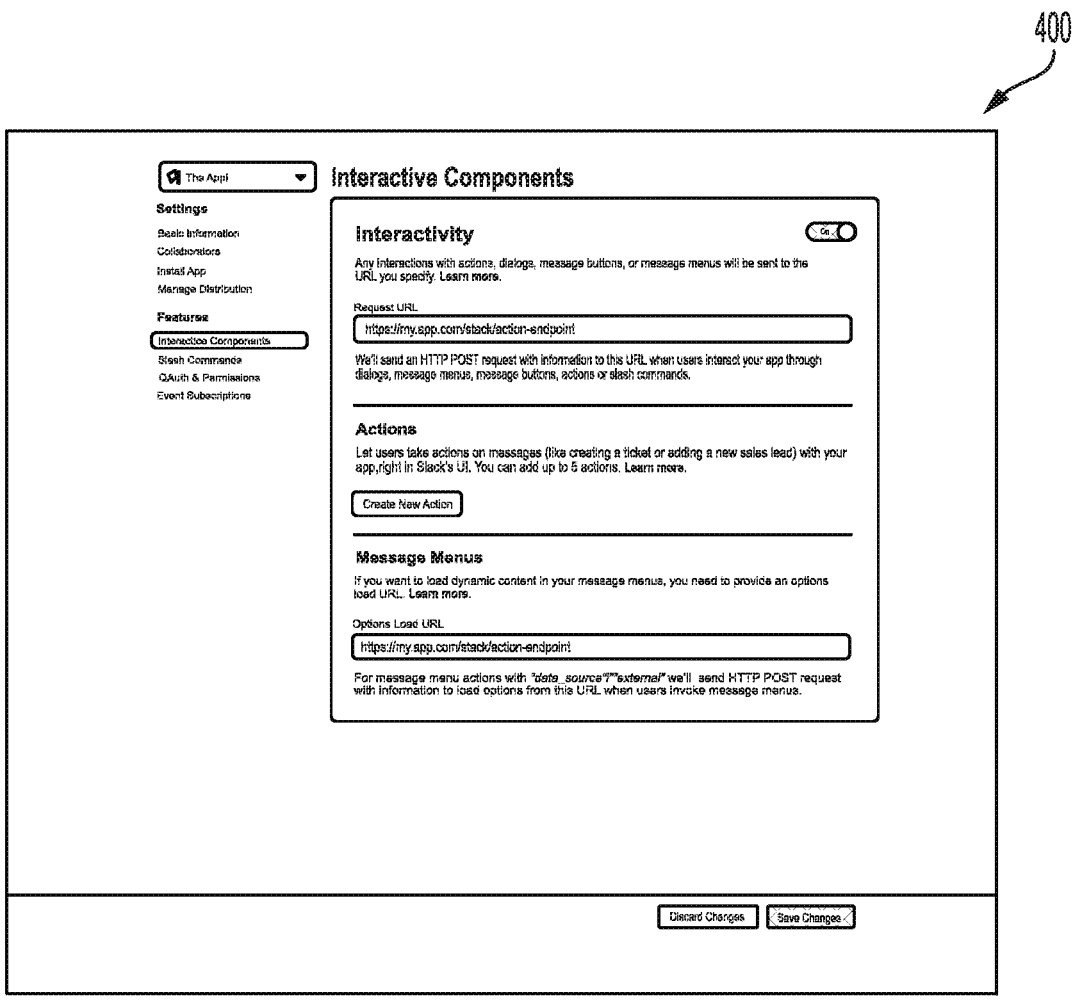
FIG. 4 illustrates a wireframe 400 providing a development portal for providing a processing action via a group-based communication platform in accordance with one embodiment.

FIG. 4 illustrates a wireframe 400 of a developer user interface presented to a developer (e.g., via a client device 102-106 usable by the developer) enabling usage of a particular processing action. As shown in FIG. 4, the developer user interface is configured to receive user input specifying a request URL relating to the external application system 112-116 for a particular processing action. The URL identifies the location to which any data (e.g., contextual data and/or payload data included within a container, additional data provided from a client device 102-106 in response to an interactive dialog, and/or the like) is provided to the external application system 112-116 to enable the external application system 112-116 to identify the requested processing action and to execute the requested processing action. Moreover, the developer user interface is additionally configured to receive user input (e.g., via a client device 102-106) initiating a process for making a particular processing action available to users of the group-based communication platform 118 (as discussed in reference to the flowchart 300 of FIG. 3, herein). Specifically, as shown in the example wireframe 400 of FIG. 4, the user interface includes an interactive "Create New Action" interface element that may be selected to initiate the process for providing relevant data to the group-based communication platform 118, for example, via the wireframe 500 illustrated in FIG. 5 and discussed herein.

Moreover, as shown in FIG. 4, the group-based communication platform 118 is configured to receive additional data regarding dynamic content to be presented to client devices 102-106. Such dynamic content may be external application system specific, and may be utilized to direct data (e.g., payload data) for a particular usage within the external application system 112-116. For example, the dynamic data may identify various existing data within the external application system 112-116, such that the external application system 112-116 may appropriately direct content of the container to the appropriate usage therein.

Figure 5:
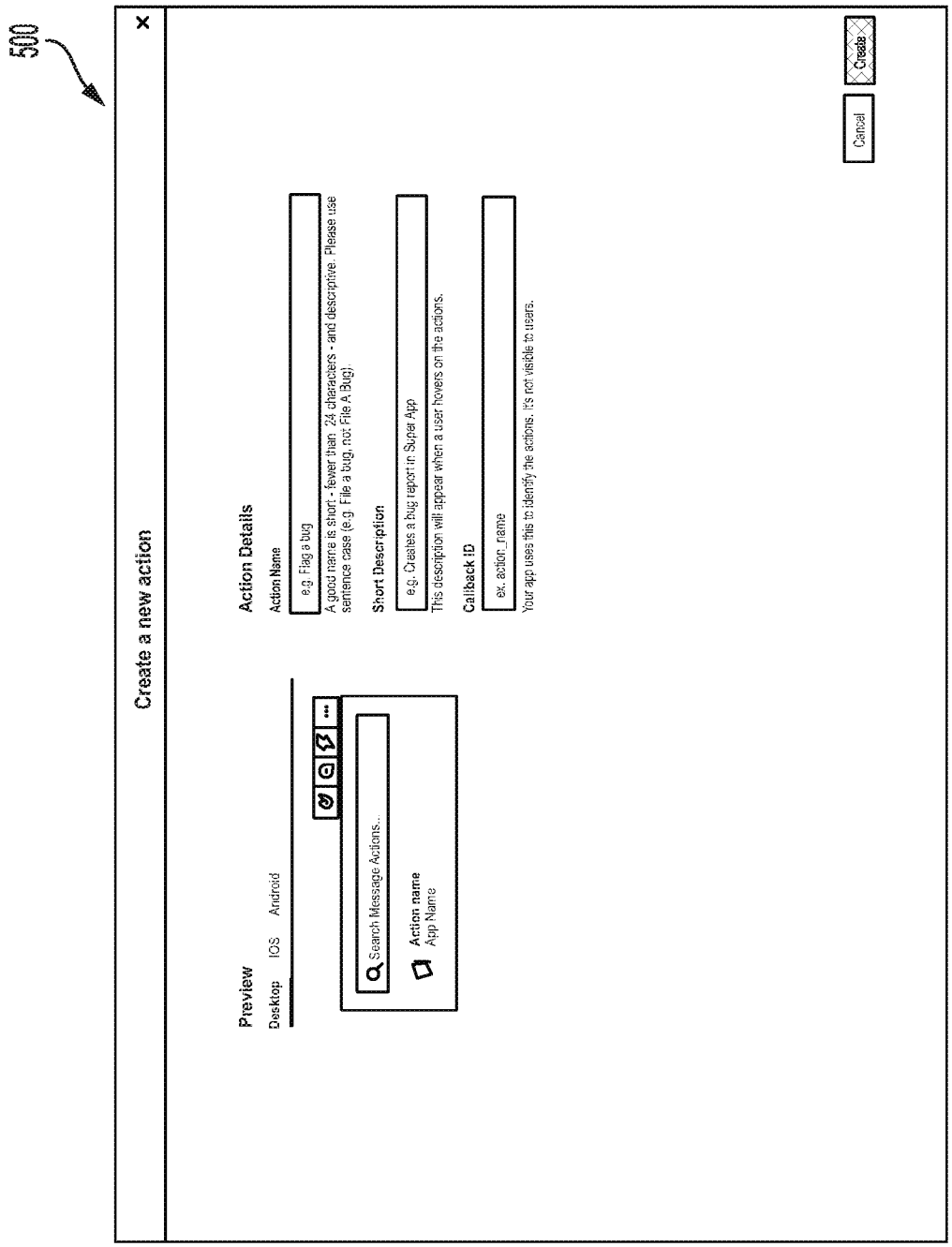
FIG. 5 illustrates a wireframe 500 providing a development portal for providing a processing action via a group-based communication platform in accordance with one embodiment.

As mentioned above in reference to FIG. 4, the wireframe 500 shown in FIG. 5 provides a secondary developer user interface configured to receive additional data regarding the functionality of a processing action to be made available to users of the group-based communication platform 118 (e.g., client devices 102-106 associated with a particular group). As discussed in reference to the flowchart 300 of FIG. 3, the processing action-specific data of certain embodiments comprises a processing action name and description to be presented to client devices 102-106 (e.g., via appropriate user interfaces), an icon or other image to be associated with the processing action, and a callback ID that may be included with containers to identify the relevant processing action to be utilized with the data included in the container. In certain embodiments, the executable portions of the processing action are stored locally at the relevant external application system, such that the group-based communication platform 118 provides relevant data in an appropriate format (e.g., via an API providing data via the URL specified during setup of the processing action) to the external application system, and provides various interactive dialogs and/or other messages relevant to the processing action to a requesting client device 102-106.

Figure 6:
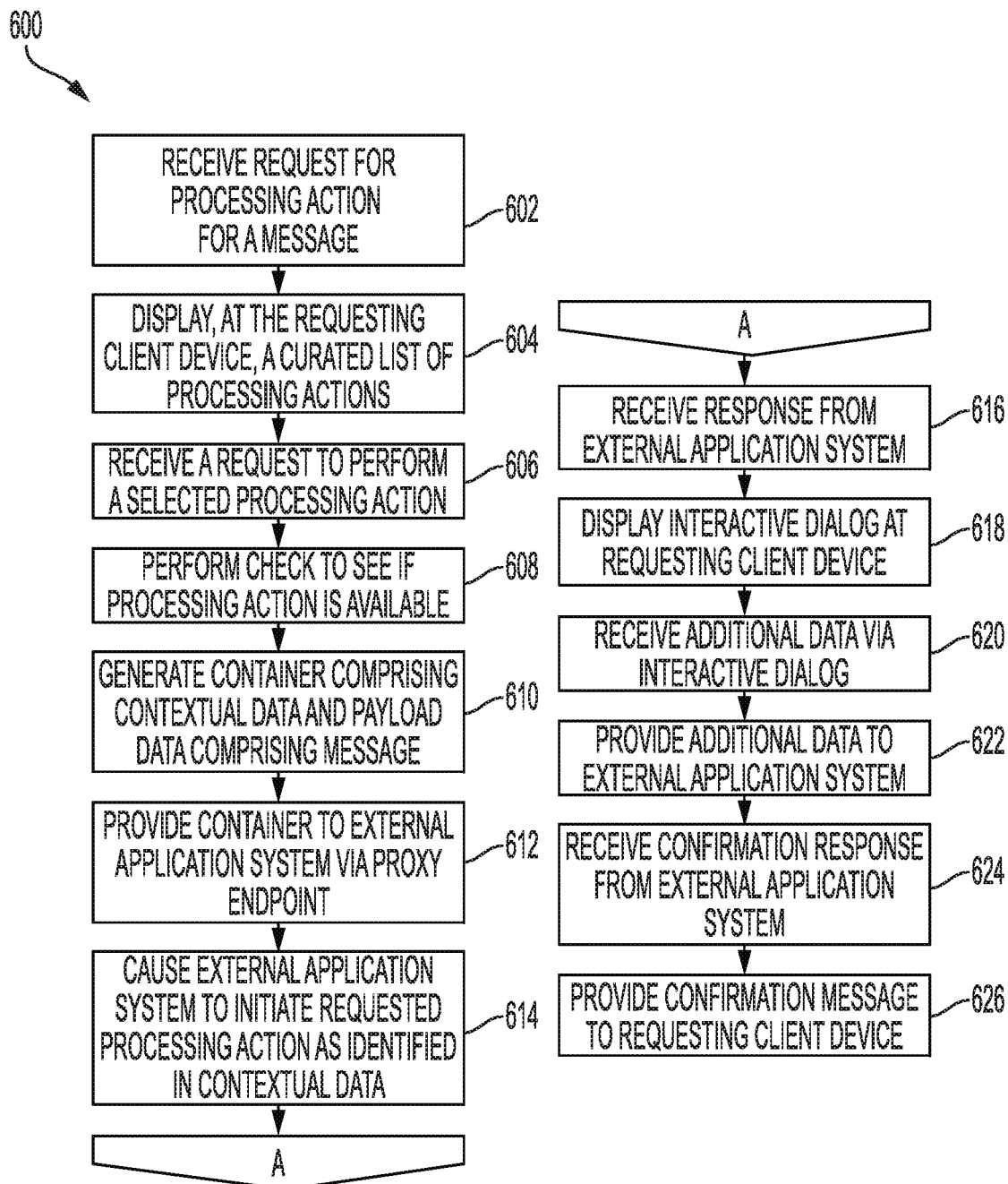
FIG. 6 illustrates a flowchart 600 for executing a processing action via a group-based communication platform in accordance with one embodiment.
Figure 7:
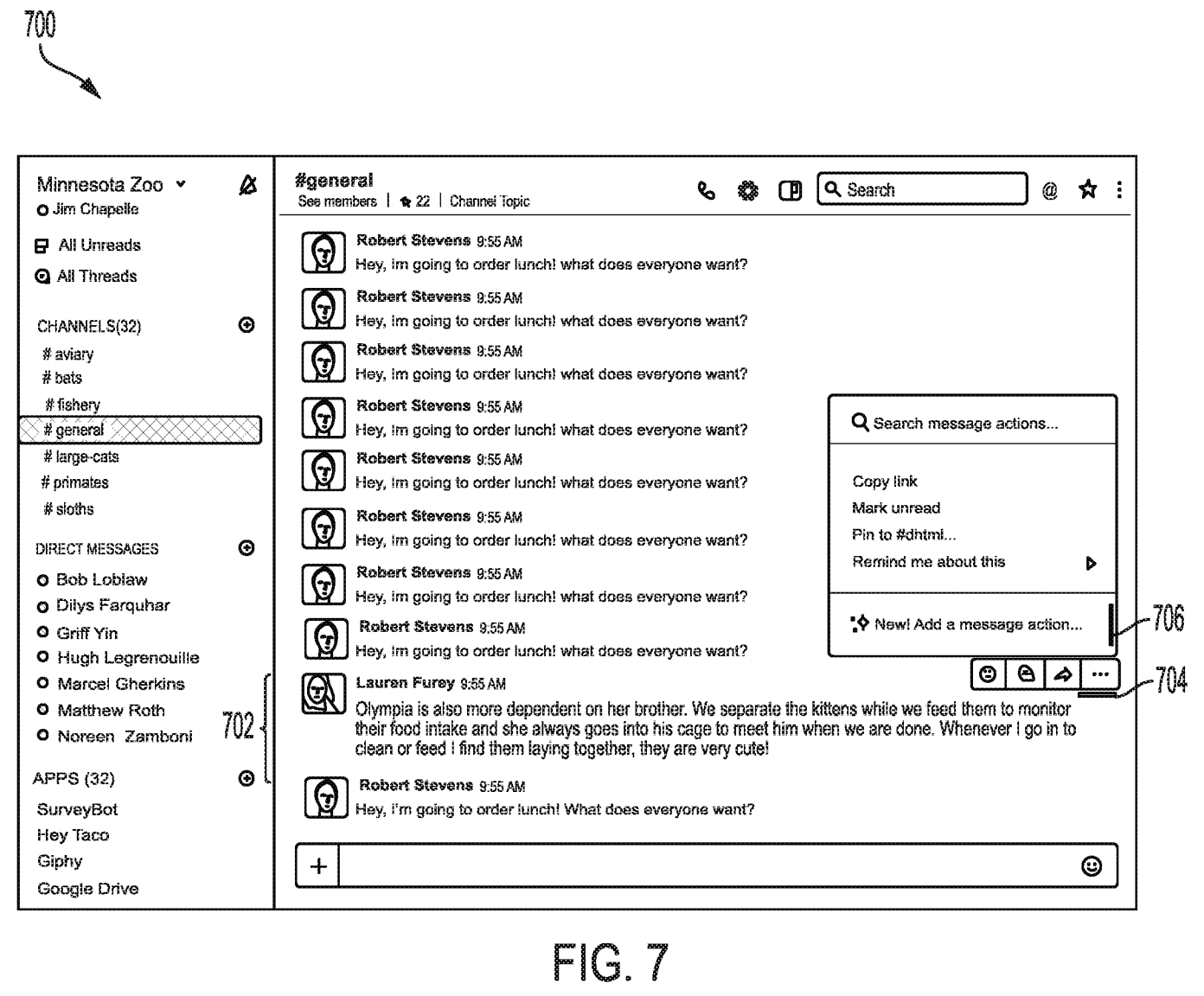

FIG. 6 illustrates a flowchart 600 providing example steps involved in initiating/executing a processing action according to one embodiment. As shown therein, the process for initiating a processing action begins upon receipt of a request for a processing action for a particular message, as shown at block 602. Upon receipt of the request, the group-based communication platform 118 generates and provides a curated list of available processing actions to the requesting client device 102-106 (e.g., as displayed in curated list 804 or curated list 902 of FIG. 8 and FIG. 9, discussed herein), as shown at block 604. In certain embodiments, the initial request may be generated at the client device 102-106 upon selection of a selection element 704 (as shown in FIG. 7) and/or a processing action option 706 displayed upon interacting with the selection element 704. As discussed herein, the selection element 704 may be message specific, such that interacting with the selection element 704 for a particular message (e.g., a text-based message 702, a file object, a plurality of text-based messages and/or file objects shared within a communication channel, and/or the like) and selecting a processing action causes the processing action to be performed for the message for which the processing action is selected.

As shown in the figures, the curated list of available processing actions may comprise a list of a defined number of available processing actions to be displayed at a client device 102-106. The number of processing actions to be included in the curated list, may be identified based on characteristics of the message for which the processing action is to be initiated (e.g., the sending user identifier associated with the message, content of the message itself, the communication channel in which the message was shared, and/or the like), characteristics of the requesting client device 102-106 (e.g., whether the client device 102-106 is a mobile device, a desktop device, and/or the like), and/or the like.

Moreover, the content of the curated list (e.g., the processing actions to be included in the curated list), as well as the order in which processing actions are displayed within the curated list may be identified based at least in part on characteristics of the message (e.g., the sending user identifier, the channel identifier associated with the message, and/or the like), data indicative of user preferences stored at the individual client devices 102-106, data indicative of historical processing action usage by the client device 102-106 (e.g., indicative of most recently utilized processing actions and/or most commonly utilized processing actions). The group-based communication platform 118 may utilize one or more algorithms (e.g., machine-learning algorithms) to generate an appropriate ordering for display of the curated list of available processing actions via the client device 102-106.

As shown at block 606, the group-based communication platform 118 receives a selection of a particular processing action to be initiated for a particular message. The requesting client device 102-106 provides data identifying the requested processing action upon receipt of corresponding user input to the group-based communication platform 118. In certain embodiments, the selected processing action may be selected from the curated list, although the processing action may also be selected within a search interface that may be utilized to navigate all available processing actions as indicated within an actions table as discussed herein.

As shown at block 608, the group-based communication platform 118 performs a validation check to determine whether the selected processing action is available for use. Although illustrated as occurring after selection of a particular processing action for execution, it should be understood that the validation check described with respect to block 608 may be performed at any time. For example, the validation check may be performed prior to generating the curated list to be provided to the requesting client device 102-106. For example, the validation check may determine whether the particular processing action has an associated URL for transmission of relevant data, whether the particular processing action is reflected within other app data provided from the external application system, and/or the like. Upon determining that the processing action is unavailable, the process for executing the processing action may stop, and an error message may be displayed via the client device 102-106. In certain embodiments, the processing action may subsequently be removed from the actions table such that the processing action is thereafter indicated as unavailable for subsequent requests.

Moreover, although not shown in FIG. 6, the group-based communication platform 118 and/or the external application system 112-116 associated with a requested processing action may perform an authentication check to determine whether the requesting client device has an associated account and/or other user login with the external application system 112-116. For example, the external application system 112-116 may provide user specific features, and accordingly the client device must be authenticated with the external application system 112-116 to provide such features. In various embodiments, authentication may be provided via the group-based communication platform 118 to enable the external application system 112-116 to associate requests to execute processing actions provided through the group-based communication platform 118 with an existing user account (and associated user-specific functionality) stored at the external application system 112-116. Authentication via the group-based communication platform 118 may be performed via an interactive dialog provided to the client device 102-106 and configured to receive user input of a user identifier and/or password for an account stored at the external application system 112-116. The data received via the authentication process may be passed to the external application system 112-116 as a part of a container (discussed in greater detail herein) thereby enabling the external application system 112-116 to associate the authenticated user account stored at the external application system 112-116 with a client identifier (e.g., a client token) provided with the container.

Upon determining that the selected processing action is available, the group-based communication platform 118 generates a container comprising contextual data and payload data for the requested processing action, as indicated at block 610. As discussed herein, the container comprises contextual data identifying data usable by the external application system to identify the requested processing action, to identify the client device requesting the processing action, and/or identifying the message on which the processing action is to be performed. As a specific example, the group-based communication platform 118 assembles the contextual data for the container to comprise (1) one or more verification tokens (e.g., a group-based communication platform 118 verification token), (2) a group-identifier, (3) a channel identifier, (4) a user identifier (e.g., a client device 102-106 specific client token identifying the client device 102-106 that requests the particular processing action), (5) a processing action identifier (e.g., a processing action name, and/or other identifying string), (6) an action type defining a processing action type, (7) a trigger defining an interactive dialog to be presented to the client device 102-106 in response to initialization of the processing action, (8) a response URL enabling the external application system to transmit a response (e.g., a confirmation response) back to the requesting client device 102-106, (9) a timestamp indicating when the processing action is requested, and/or the like. The container additionally comprises payload data comprising the message for which the processing action was requested.

Upon generation of the container, the group-based communication platform 118 provides the container to the external application system 112-116 identified with the contextual data via the proxy endpoint identified within the contextual data, as shown at block 612. The proxy endpoint provides an API for passing the container from the group-based communication platform 118 to the external application system 112-116, thereby enabling the external application system 112-116 to consume the contextual data and/or the payload data within the container while executing a requested processing action. Providing the container to the external application system 112-116 causes the external application system 112-116 to initiate the requested processing action as identified in the contextual data, as shown at block 614.

As discussed herein, the processing action may cause the external application system 112-116 to generate a new data object to be stored within a data repository associated with the external application system 112-116, to modify an existing data object stored within the data repository associated with the external application system 112-116, to delete an existing data object stored within the data repository associated with the external application system 112-116, and/or the like. For example, the external application system 112-116 may execute a calendar app, and therefore the processing action may be configured to generate a new calendar entry to be stored within the data repository associated with the external application system 112-116. As yet another example, the external application system 112-116 may be embodied as a software bug tracking system, and therefore the processing action may edit an existing record associated with a particular software bug with additional information as identified within a particular message shared within the group-based communication platform 118.

Figure 11:
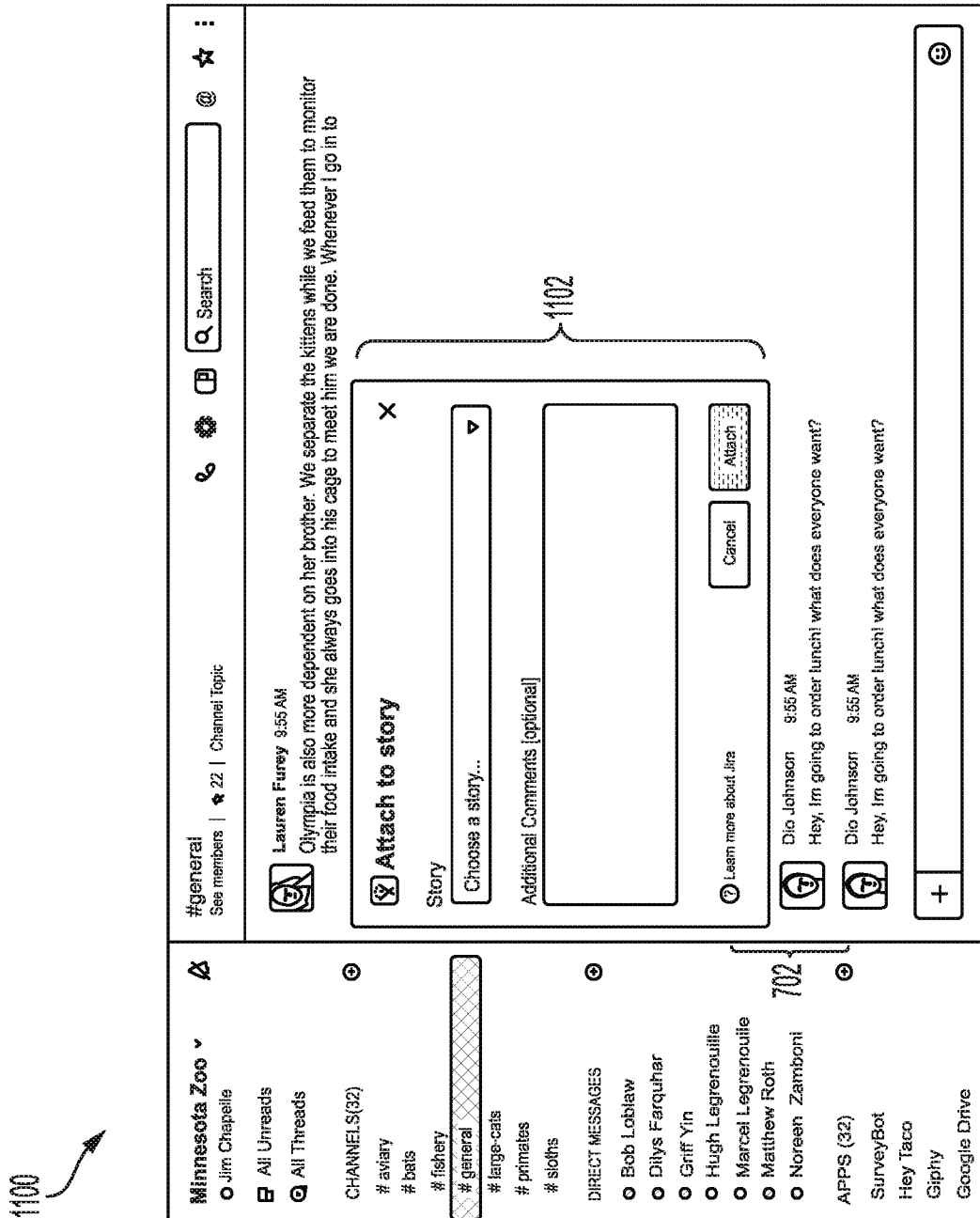
FIG. 11 illustrates a wireframe 1100 illustrating an interactive dialog in accordance with one embodiment.

As a part of executing the processing action, the external application system 112-116 provides a response to the group-based communication platform 118 which causes the group-based communication platform 118 to provide an interactive dialog to the requesting client device, as indicated at block 616 and block 618. FIG. 11, discussed in greater detail herein, provides an example interactive dialog 1102 presented via a user interface displayed on the client device 102-106 to request additional data to be utilized while executing the processing action. In certain embodiments, the interactive dialog may request data indicative of a particular data object stored within the data repository associated with the external application system 112-116 to be edited based on execution of the processing action, as indicated at block 620 of FIG. 6. The interactive dialog may additionally be configured to receive additional data (e.g., text-based data, images, and/or the like) as additional comments to be provided with the payload data to the external application system, as indicated at block 622 of FIG. 6.

The group-based communication platform 118 may additionally be configured for interpreting one or more error states that may be encountered as a result of passing the container to the external application system 112-116. For example, if the group-based communication platform 118 does not receive a response from the external application system 112-116 within a defined period of time (e.g., 5 seconds after transmitting the container via the proxy endpoint), the group-based communication platform 118 may provide an error message (e.g., in the form of an icon, a dialog, or a message displayed within the communication interface). As yet another example, upon receipt of a response from the external application system 112-116 indicating an error occurred, the group-based communication platform 118 may be configured to communicate the received error response to the requesting client device 102-106. While the group-based communication platform 118 awaits the receipt of the response, the client device 102-106 may maintain an open dialog indicative of the requested processing action, such that any errors received and passed on to the client device 102-106 may be easily correlated with the recently requested processing action.

Once the external application system 112-116 completes execution of the requested processing action, the external application system 112-116 provides a confirmation response to the group-based communication platform 118, as indicated at block 624, and the group-based communication platform 118 provides a confirmation message to the requesting client device, as indicated at block 626. In certain embodiments, the confirmation message may be displayed via a dialog displayed via the user interface of the requesting client device 102-106 or the confirmation message may be displayed as a message exchanged via the group-based communication platform 118. In certain embodiments, the confirmation message may be displayed within the same communication channel in which the message of the payload data was originally shared (e.g., the confirmation message may be shared publicly to be visible to all client devices 102-106 having access to the particular communication channel, or the confirmation message may be shared privately, to be visible only to the requesting client device 102-106). The confirmation message may alternatively be provided to the requesting client device 102-106 via a separate communication channel operable between the requesting client device 102-106 and the external application system 112-116 (e.g., operating an app that provides messages to the client device 102-106).

FIG. 7 is an example wireframe 700 providing a group-based communication interface as visible via a client device 102-106. The example shown in FIG. 7 illustrates messages shared between various client devices 102-106 within the "#general" communication channel. As shown in FIG. 7, a selection element 704 has been selected for text-based message 702, thereby providing a visible menu of action items that may be performed with respect to the selected text-based message 702. One of those displayed options is a processing action option 706, which causes the user interface to display options (e.g., a curated list 804, as shown in FIG. 8) of available processing actions that may be performed for the selected text-based message 702.

Figure 8:
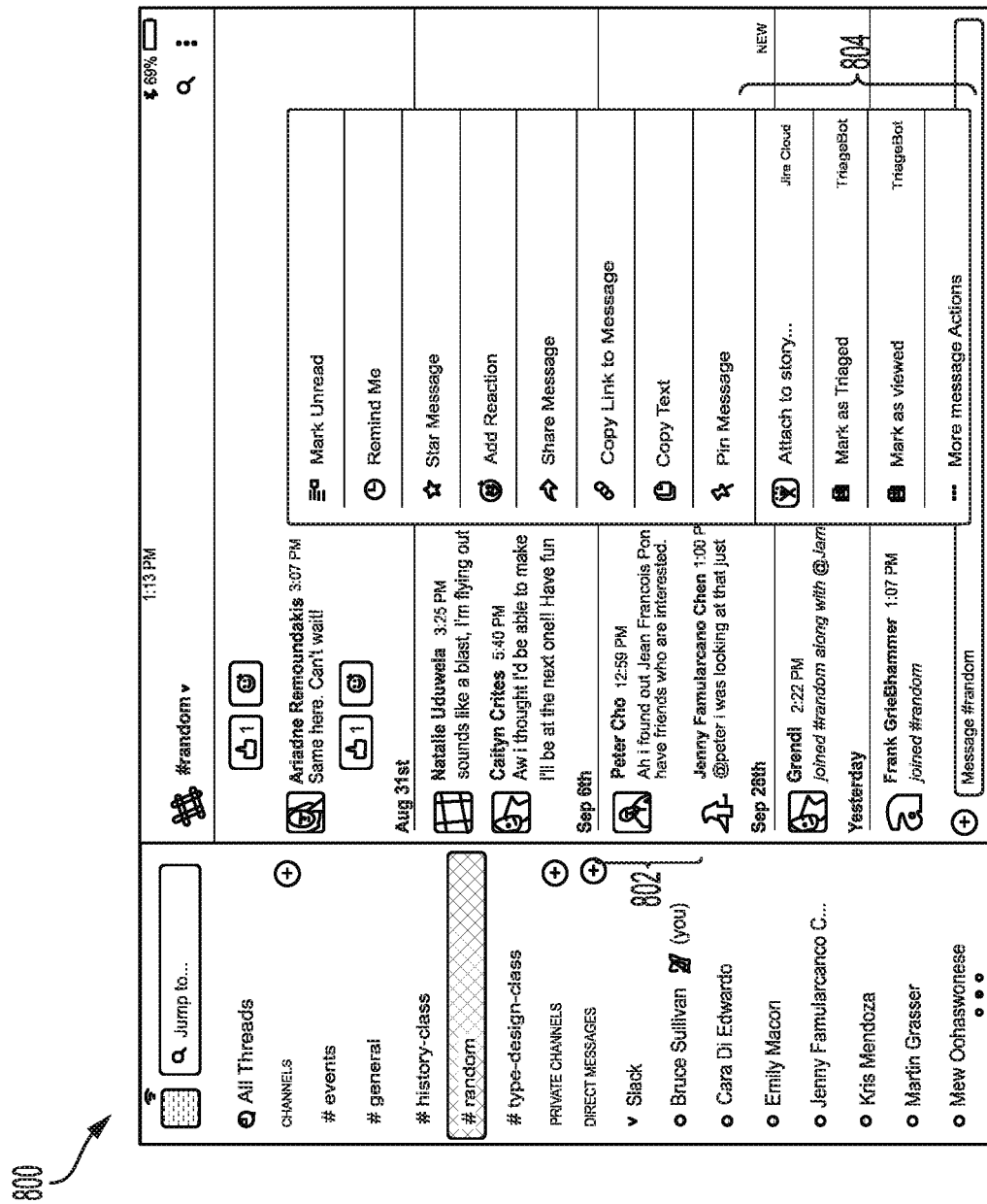
FIG. 8 illustrates a wireframe 800 of a group-based communication interface in accordance with one embodiment.

FIG. 8 provides another example wireframe 800 providing a group-based communication interface as visible via a client device 102-106. The example shown in FIG. 8 illustrates messages shared between various client devices 102-106 within the "#random" communication channel. As shown in FIG. 8, a selection element (not shown) has been selected for a text-based message 802, causing a visible menu of action items to be displayed that may be performed for the selected text-based message 802. As a part of the visible menu, a curated list 804 of available processing actions is displayed, along with an option for reviewing additional available processing actions by selecting the "More Message Actions" item.

Figure 9:
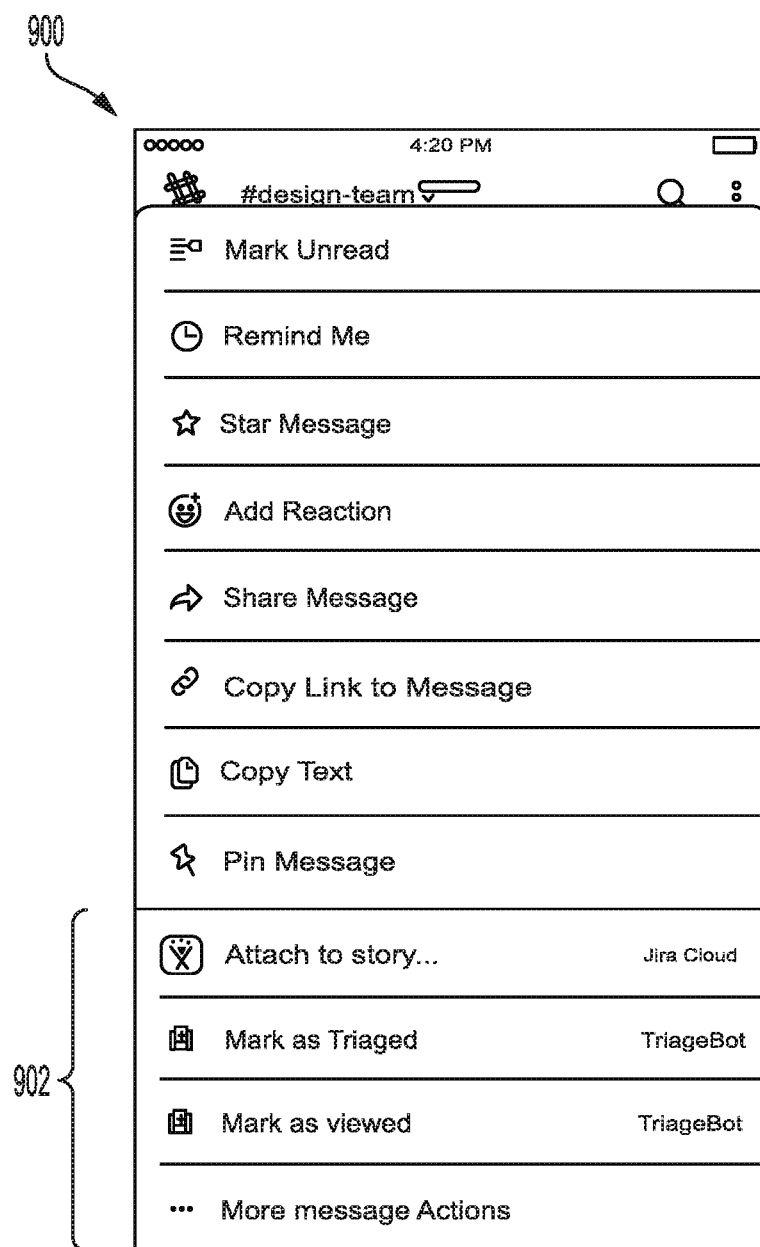
FIG. 9 illustrates a wireframe 900 comprising a curated list of available processing actions in accordance with one embodiment.

FIG. 9 provides yet another example wireframe 900 of a user interface that may be provided with a group-based communication interface, particularly as it may be provided via a mobile device. The example shown in FIG. 9 illustrates a visible menu of action items that may be displayed via a client device 102-106 upon receipt of user input selecting a particular message. As shown in FIG. 9, the visible menu comprises a curated list 902 of available processing actions, along with an option for reviewing additional available processing actions by selecting the "More Message Actions" item.

Figure 10:
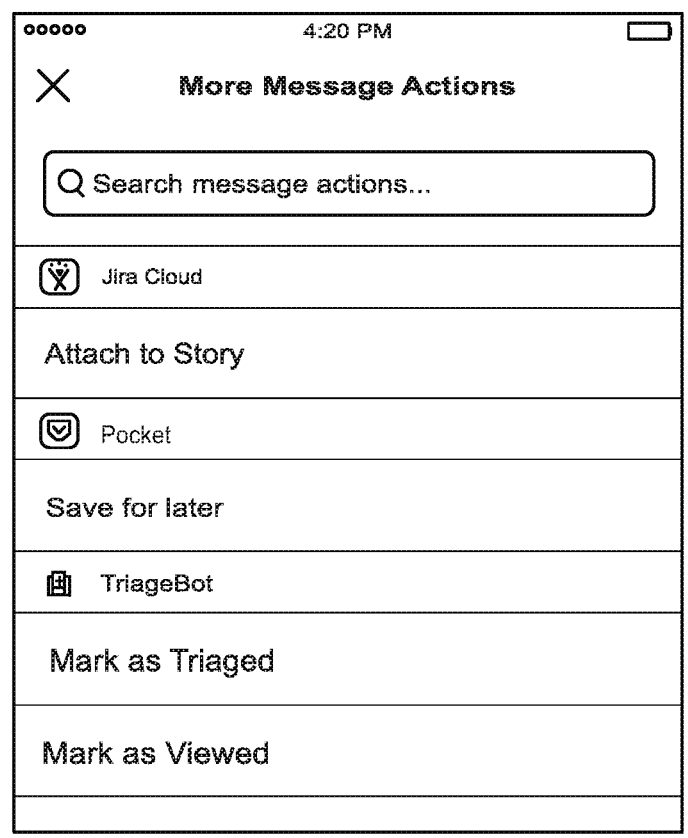
FIG. 10 illustrates a wireframe 1000 illustrating a plurality of processing actions in accordance with one embodiment.

FIG. 10 provides another example wireframe 1000 of a user interface that may be provided with a group-based communication interface, particularly as it may be presented via a mobile device. The example shown in FIG. 10 provides an example menu that may be displayed upon a user selecting a "More Message Actions" item as shown in FIG. 9, discussed above. The wireframe 1000 of FIG. 10 comprises a search functionality configured for receipt of user input searching for a particular processing action. The wireframe 1000 additionally comprises a complete list of available processing actions for the selected message. As discussed herein, the processing actions identified within the listing shown in wireframe 1000 are identified from an actions table stored within a data repository associated with the group-based communication platform 118 and identifying processing actions available for a particular group, channel, message, client device, and/or the like.

FIG. 11 is a wireframe 1100 illustrating an example interactive dialog 1102 displayable via a client device 102-106 after requesting a processing action to be executed. As shown in FIG. 11, the interactive dialog 1102 is configured to receive data indicating a particular story (e.g., data object) that the payload data of the container should be associated. Moreover, the interactive dialog 1102 may be configured to receive additional comments that may be associated with the payload data of the container and utilized by the external application system to execute the requested processing action.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
presenting, via a client device of a group-based communication platform, a user interface associated with the group-based communication platform, wherein the user interface includes a user interface element, interaction therewith, invoking one or more commands;
based at least in part on an interaction with the user interface element, generating first data that is associated with an indication of a command, of the one or more commands, invoked via the interaction;

based at least in part on the first data, determining a response to the first data; and causing an interactive dialog to be presented via the user interface, wherein the interactive dialog is configured to prompt a user of the client device for second data associated with a processing action associated with the command.

2. The computer-implemented method recited in claim 1, further comprising:

determining a type of the command, the type of the command being an action command or a search command; and determining the response to the first data based at least in part on the type of the command.

3. The computer-implemented method recited in claim 2, wherein the action command causes the interactive dialog to be presented via the user interface.

4. The computer-implemented method recited in claim 2, wherein the search command facilitates a search of an external system that is different than the group-based communication platform, wherein the interactive dialog is configured to present one or more results responsive to the search.

5. The computer-implemented method recited in claim 1, wherein the command is associated with an external system that is different than the group-based communication platform, the computer-implemented method further comprising:

based at least in part on the interaction with the user interface element, causing the first data to be sent to the external system;

based at least in part on causing the first data to be sent to the external system, receiving the response from the external system; and causing the second data to be sent to the external system for performing the processing action.

6. The computer-implemented method recited in claim 1, wherein at least one of:

the user interface element is associated with a message in a communication channel of the group-based communication platform; or the user interface element is associated with a search interface associated with the group-based communication platform.

7. The computer-implemented method recited in claim 1, further comprising:

based at least in part on receiving the indication of the interaction with the user interface element, causing a list of commands to be presented via the user interface, wherein the list of commands comprises the one or more commands and one or more other commands associated with one or more external systems that are different than the group-based communication platform; and receiving a selection of the command, wherein the second data is sent to the external system based at least in part on receiving the selection of the command.

8. The computer-implemented method recited in claim 1, further comprising:

causing the second data to be sent to an external system that is different than the group-based communication platform;

receiving, from the external system, a second indication that the processing action associated with the command is complete; and causing a message to be presented in association with a communication channel indicating that the processing action associated with the command is complete.

9. A system comprising:

memory;

one or more processors; and one or more computer-executable instructions stored in the memory and executable by the one or more processors to:

present, via a client device of a group-based communication platform, a user interface associated with the group-based communication platform, wherein the user interface includes a user interface element, interaction therewith, invoking one or more commands;

based at least in part on an interaction with the user interface element, generate first data that is associated with an indication of a command, of the one or more commands, invoked via the interaction;

based at least in part on the first data, determine a response to the first data; and cause an interactive dialog to be presented via the user interface, wherein the interactive dialog is configured to prompt a user of the client device for second data associated with a processing action associated with the command.

10. The system recited in claim 9, wherein the one or more computer-executable instructions are further executed by the one or more processors to:

determine a type of the command, the type of the command being an action command or a search command; and determine the response to the first data based at least in part on the type of the command.

11. The system recited in claim 10, wherein the action command causes the interactive dialog to be presented via the user interface.

12. The system recited in claim 10, wherein the search command facilitates a search of an external system that is different than the group-based communication platform, wherein the interactive dialog is configured to present one or more results responsive to the search.

13. The system recited in claim 9, wherein the command is associated with an external system that is different than the group-based communication platform, and wherein the one or more computer-executable instructions are further executed by the one or more processors to:

based at least in part on the interaction with the user interface element, cause the first data to be sent to the external system;

based at least in part on causing the first data to be sent to the external system, receive the response from the external system; and cause the second data to be sent to the external system for performing the processing action.

14. The system recited in claim 9, wherein at least one of:

the user interface element is associated with a message in a communication channel of the group-based communication platform; or the user interface element is associated with a search interface associated with the group-based communication platform.

15. The system recited in claim 9, wherein the one or more computer-executable instructions are further executed by the one or more processors to:

based at least in part on receiving the indication of the interaction with the user interface element, cause a list of commands to be presented via the user interface, wherein the list of commands comprises the one or more commands and one or more other commands associated with one or more external systems that are different than the group-based communication platform; and receive a selection of the command, wherein the second data is sent to the external system based at least in part on receiving the selection of the command.

16. The system recited in claim 9, wherein the one or more computer-executable instructions are further executed by the one or more processors to:

cause the second data to be sent to an external system that is different than the group-based communication platform;

receive, from the external system, a second indication that the processing action associated with the command is complete; and cause a message to be presented in association with a communication channel indicating that the processing action associated with the command is complete.

17. One or more non-transitory computer-readable media storing one or more computer-executable instructions that, when executed by one or more processors, cause the one or more processors to perform operations comprising:

presenting, via a client device of a group-based communication platform, a user interface associated with the group-based communication platform, wherein the user interface includes a user interface element, interaction therewith, invoking one or more commands;

based at least in part on an interaction with the user interface element, generating first data that is associated with an indication of a command, of the one or more commands, invoked via the interaction;

based at least in part on the first data, determining a response to the first data; and causing an interactive dialog to be presented via the user interface, wherein the interactive dialog is configured to prompt a user of the client device for second data associated with a processing action associated with the command.

18. The one or more non-transitory computer-readable media recited in claim 17, wherein the command is associated with an external system that is different than the group-based communication platform, and wherein the operations further comprise:

based at least in part on the interaction with the user interface element, causing the first data to be sent to the external system;

based at least in part on causing the first data to be sent to the external system, receiving the response from the external system; and causing the second data to be sent to the external system for performing the processing action.

19. The one or more non-transitory computer-readable media recited in claim 17, wherein the operations further comprise:

based at least in part on receiving the indication of the interaction with the user interface element, causing a list of commands to be presented via the user interface, wherein the list of commands comprises the one or more commands and one or more other commands associated with one or more external systems that are different than the group-based communication platform; and receiving a selection of the command, wherein the second data is sent to the external system based at least in part on receiving the selection of the command.

20. The one or more non-transitory computer-readable media recited in claim 17, wherein the operations further comprise:

determining a type of the command, the type of the command being an action command or a search command; and determining the response to the first data based at least in part on the type of the command.

* * * * *